INVENTOR
AMBROSE J. CALLAGHAN

BY *Charles L. Sturtevant*
ATTORNEY

Dec. 3, 1957    A. J. CALLAGHAN    2,814,953
TEMPERATURE MEASURING DEVICES FOR FURNACES
AND MOUNTING THEREFOR
Filed Jan. 10, 1955    2 Sheets-Sheet 2

INVENTOR.
AMBROSE J. CALLAGHAN 2,814,953

TEMPERATURE MEASURING DEVICES FOR FURNACES AND MOUNTING THEREFOR

Ambrose J. Callaghan, Hamburg, N. Y.

Application January 10, 1955, Serial No. 480,734

18 Claims. (Cl. 73—355)

The present invention relates to new and useful improvements in temperature measuring devices, and more particularly to improvements in temperature measuring devices of the radiation pyrometer or like type often used in the measurement of roof and wall temperatures in furnaces for melting and refining steel, such as, for instance, in open hearth furnaces.

The invention generally contemplates the provision of a measuring device of this general character which is of sufficient reliability to obtain continuous temperature readings of the side walls or roof of an open hearth furnace so that the device may be interconnected with various instruments to effect automatic recording reading and control of the temperature in a furnace, as shown, for instance, in Hogg et al., 2,177,805.

In furnaces of this type, that is, open hearth furnaces, there are many difficult problems to be dealt with because of the extremely high temperatures which prevail and this, coupled with furnace atmosphere and other conditions, leads to critical problems involving erosion of the brickwork forming the wall or roof surfaces, and the like. Thus, continuous and automatic temperature control is desirable to effect economy in fuel consumption and also to prolong the useful life of the wall and roof structures so as to reduce to a minimum the "down" periods necessary for repair or rebuilding, thus to reduce the ordinary cost of maintenance.

In the light of the foregoing remarks, one of the principal objects of the present invention is to provide an improved mounting for a sight tube assembly in which the pyrometer or other primary temperature responsive element is mounted and to effect cooling of such assembly when permanently mounted in the furnace wall structure.

Another object of the invention is to provide for the automatic ejection and salvaging of the relatively expensive pyrometer or like responsive element in the event of overheating such as might be caused by failure of the cooling system, or failure of the furnace temperature control.

Another object of the invention is to provide, in the above type of assembly, means for mechanically and periodically clearing the sight tube opening, such as on each reversal of firing of the furnace.

A further object of the invention is to provide, in the above type of assembly, a sight tube wherein the opening into the furnace is somewhat larger than the line of sight to the pyrometer so that some accumulation of material around the opening does not interfere with the sight passage for the pyrometer, thus facilitating an assembly requiring cleaning of the sight tube opening less frequently.

A still further object of the invention is to provide, in an assembly of the above type, means for maintaining the protective lens in the sight tube clear of impurities and cloudiness so that the sight tube opening is always clear for accurate measurement of the temperatures by the pyrometer or like primary responsive element.

A still further object of the invention is to provide an auxiliary sight tube for checking purposes.

The invention still further aims to provide an assembly of the foregoing character which is relatively easy to install and maintain, which is protected in its installed position for accurate and continuous temperature measurements, and which itself protects the primary temperature responsive element mounted in the sighting tube.

The above and other objects of the invention will in part be obvious and will hereinafter be more fully pointed out.

Figure 1:
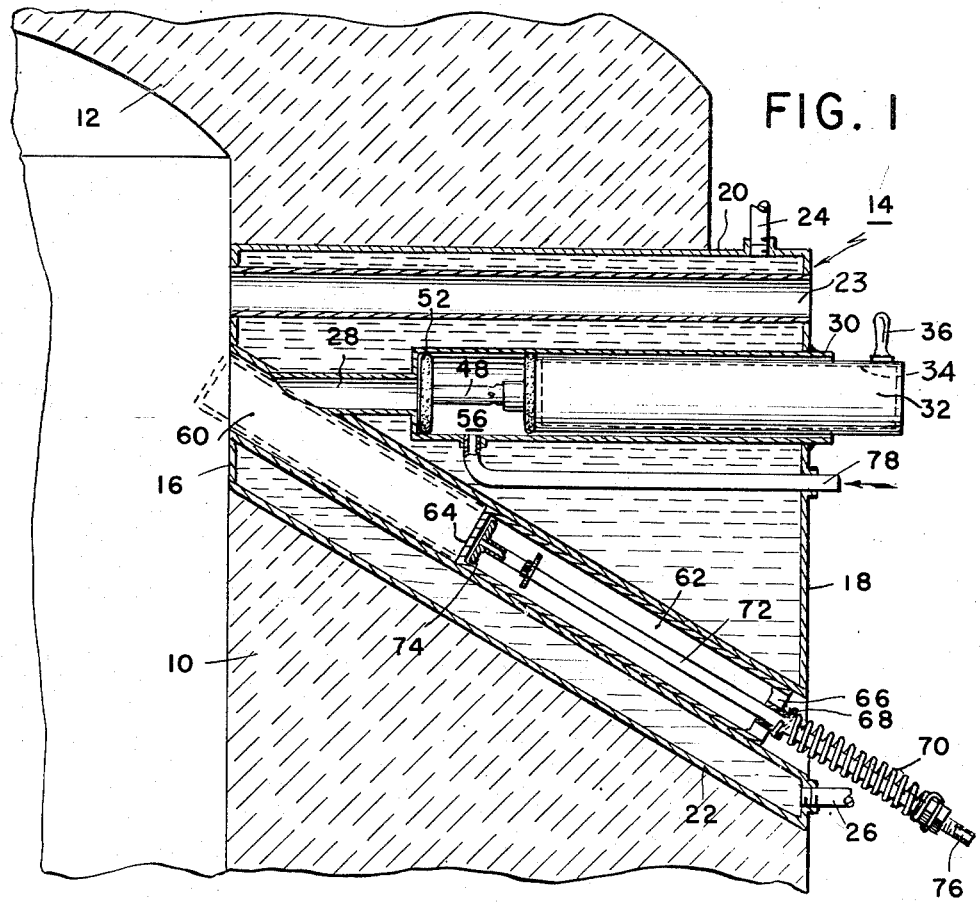
Fig. 1 is a sectional view through a furnace wall showing the sight tube assembly and pyrometer mounted therein for wall temperature measurement.

Referring more in detail to the accompanying drawing and particularly Fig. 1 at this time, there is shown a fragmentary section of a furnace, such as an open hearth furnace, having a side wall 10 and a roof portion 12. Mounted in the side wall is a casing member generally indicated by the numeral 14. This casing includes front and rear walls 16, 18 and peripheral closing walls 20, 22. The casing is hollow and provided with conduits 24, 26 which provide for the circulation of cooling liquid through the casing.

Figure 2:
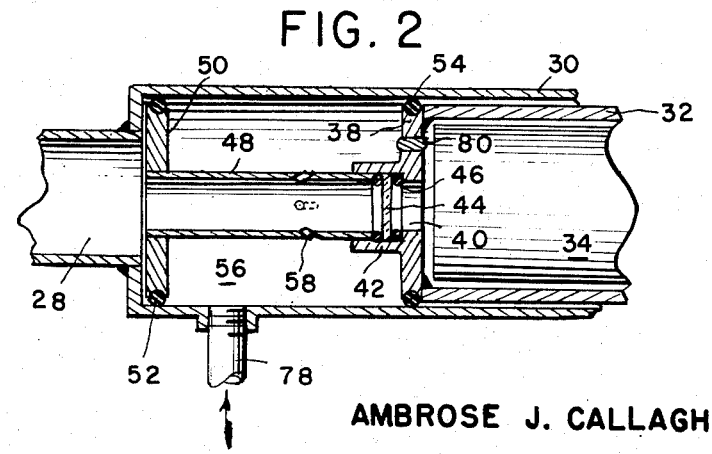
Fig. 2 is an enlarged, fragmentary sectional view through the sight tube opening and showing the air supply arrangement for maintaining the protective lens clear.
Figure 3:
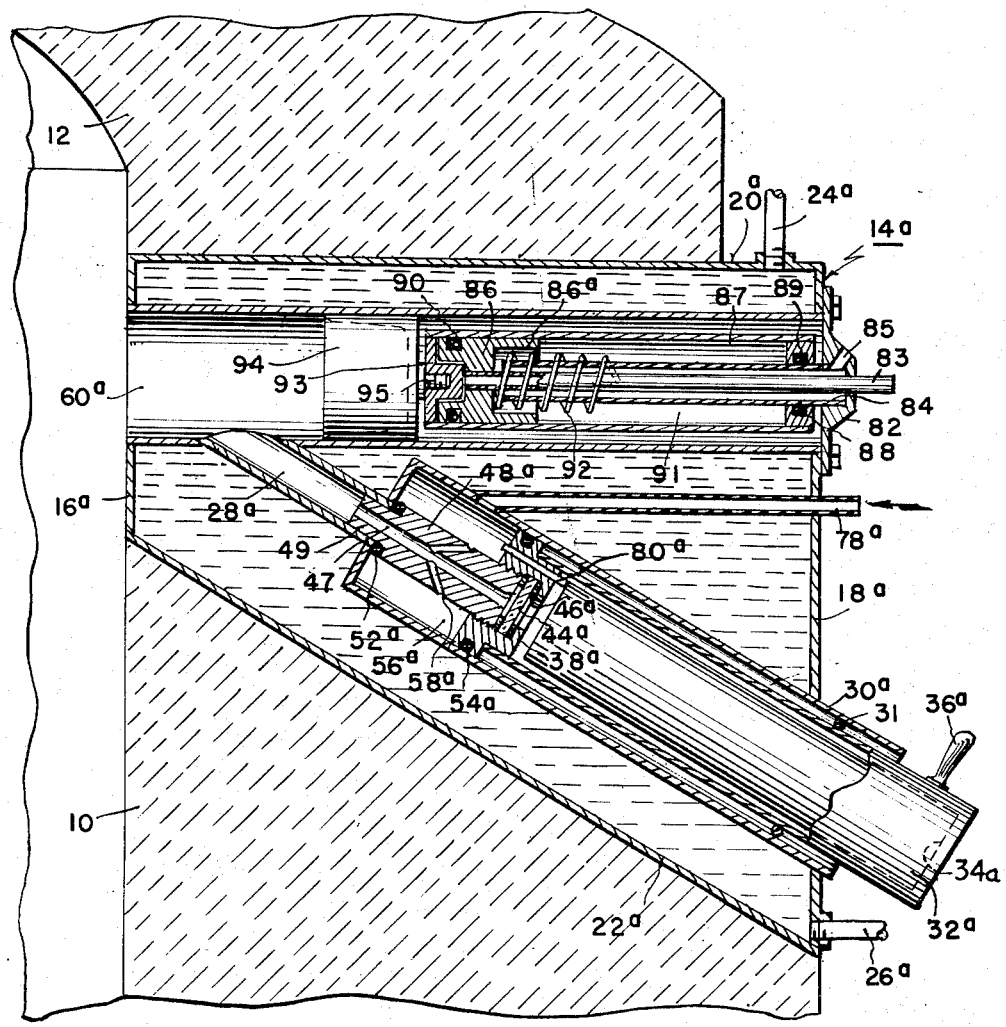
Fig. 3 is a sectional view through a furnace wall, similar to Fig. 1, but showing the sight tube assembly and pyrometer mounted therein for roof temperature measurement, and also showing certain structural modifications.

Within the casing there is mounted a sight tube 28 extending in a generally horizontal direction to respond to the temperature of the opposite furnace wall. In this connection, it is to be clearly understood that the entire casing assembly may be mounted in the furnace wall in a position such that the sight tube is inclined upwardly to permit response to temperature of the furnace roof, as shown in Fig. 3. Referring to Fig. 2, it will be seen that the inner end of the sight tube 28 is joined to a casing member 30 which extends through the outer casing wall 18. Within the casing 30 there is provided a housing or casing 32 which is to receive the pyrometer or other temperature responsive device 34 and this inner casing 32 may be provided with a handle 36 or the like to facilitate its manipulation in inserting or removing the same from the assembly.

The inner end wall 38 of the casing 32 is provided with a central aperture 40 in line with the sight passage of the primary element 34. There is provided a projecting sleeve portion 42 on the end wall 38 and within this sleeve portion there is mounted a protective lens 44. Suitable sealing gaskets 46 are employed for mounting the lens therebetween and the lens is maintained in sealed position against the outer end of a tube 48 which forms a reduced extension of the sight tube 28. The inner end of this reduced diameter tube 48 is joined to a closing plate 50 which is sealed by gasket 52 against the inner surface of the casing 30 and likewise, the end wall 38 of the casing 32 is sealed by a gasket 54 to the inner surface of the casing 30. There is thus provided a chamber 56 between the adjacent end of the casing 30 and the inner sight tube 48 which is provided with peripherally spaced passages 58 therethrough, these passages being inclined inwardly toward the inner end of the sight tube.

The inner end of the sight tube 28 intersects a tube 60 which is inclined with respect to the axis of the sight tube and the intersection therewith is disposed inwardly of the inner surface of the wall 10. The inner open end of the tube 60 is of a diameter greater than the diameter of the sight tube 28 so that, within certain limits, material from the interior of the furnace may accumulate around the inner end of the tube 60 without impairing the sight passage through the sight tubes 28, 48. Within the tube 60 there is mounted a hollow plunger 62 having a closed inner end 64. The outer end of the plunger is joined by radial webs 66 to a sleeve 68 which is connected to a spring 70 acting as a retracting spring to normally hold the plunger in its outer position, that is, the full line position of Fig. 1. Within the plunger 62 there is provided a conduit 72 with a stationary piston head 74 at the outer end thereof. The conduit 72 is connected to a source of fluid under pressure through the connection 76.

The chamber 56 around the inner sight tube 48 is also in communication through the conduit 78 with a source of air or other fluid under pressure which, upon entering the chamber 56, will be forced inwardly through the inclined passages 58 and thus create what may be termed a vortex vacuum area in advance of the protective lens 44 which thus operates to prevent accumulation of dust particles or cloudiness on the surface of the lens.

There is also provided an auxiliary sight tube 23 disposed above the operating sight tube and casing assembly and this auxiliary tube 23 may be used for checking purposes and may, of course, be closed off.

In operation of the device, the pyrometer or other primary temperature responsive element 34 is mounted in the casing 32 which is assembled in telescoping relation with the casing 30 and with the inner sight tube 48 to maintain the protective lens in sealed position. The temperature of the opposite furnace wall, or the furnace roof if the assembly is so mounted, is picked up by the pyrometer through the sight tubes 28, 48 and the pyrometer may be connected in suitable manner to a furnace control mechanism or the like. The entire sight tube assembly and pyrometer are under constant cooling conditions by the circulation of fluid through the conduits 24, 26. A certain amount of material may accumulate around the inner opening of the tube 60 before there is any impairment of the sight passage through the sight tubes 28, 48. The supply of air under pressure to the conduit 72 is controlled by means (not shown) operating in response to reversal of firing of the furnace. Thus, upon each reversal, air under pressure is admitted to the conduit 72 through the connection 76 and this air under pressure will force the plunger 62 inwardly to the dotted line position shown in Fig. 1. In this inwardly projected position of the plunger 62, any material accumulated around the opening of the tube 60 will be mechanically knocked off so that the opening through the tube 60 is now in condition to receive further accumulation of material until the next reversal of the furnace. From the projected position of the plunger 62, upon shutting off the supply of air under pressure, the retracting spring acts to return the plunger to its housed solid line position as shown in Fig. 1.

During continuous temperature reading, and controls resulting therefrom, there is a constant supply of air under pressure through the conduit 78 to the chamber 56 and as pointed out above, this air under pressure finds its way out through the sight tubes along the inclined passages 58 formed in the inner sight tube 48, and the action of the air under pressure is to create a vacuum substantially in the form of a vortex in advance of the lens 44. In this manner, no foreign material is permitted to reach the lens 44 and the lens is maintained perfectly clear for sight passage of the pyrometer device.

If there should be an overheating of the furnace or a failure of the cooling fluid supply such as to cause damage to the pyrometer if left in the casing 32, there is provided in the end wall 38 of the casing 32 an aperture which is closed by a fusable plug 80 selected from a material which will fuse at a predetermined temperature slightly below that at which the pyrometer would be damaged. Should the assembly reach such a temperature, the plug 80 will fuse or tend to melt and the air under pressure within the chamber 56 will then blow through the aperture when the plug 80 is fused and will thus act against the inner end of the pyrometer to eject the same from the casing 32 somewhat in the nature of a piston action. The ejection of the pyrometer can be into a suitable receptacle or other receiving means and, additionally, there may be provided a dividing wall between the walls 38, 50 for the mounting of the fusible plug, in which case fusing of the plug would result in the casing 32 and its contained pyrometer being both ejected outwardly as a unit to prevent damage to the pyrometer.

In Fig. 3 of the accompanying drawings, there is shown an assembly wherein the pyrometer and sight tube are mounted in the furnace wall in an inclined position to respond to the roof temperature of the furnace and some modifications have been included in this form of the invention. The assembly is mounted in the wall 10 of the furnace to measure the temperature of the roof 12 and includes a casing member 14a having inner and outer walls 16a, 18a and peripheral closing walls 20a, 22a. Conduits 24a, 26a provide for the circulation of a coolant through the hollow casing 14a.

A sight tube 28a within the casing extends at an upwardly inclined angle such as to permit response to the temperature of the roof 12 of the furnace and joins a larger casing 30a extending through the outer casing wall 18a. An inner housing or casing 32a carries the pyrometer and is disposed within the casing 30a and is sealed therein by a gasket 31.

The inner end of the casing 32a is closed by plug-like end wall 38a having threaded connection with a cylinder 48a having a central aperture 47 therethrough in communication with the sight tube 28a. Gaskets 46a seal a protective lens 44a in the end wall 38a, and a gasket 54a provides a seal between the casing 30a and the end wall 38a. The inner end of the casing 30a provides a chamber 56a around the cylinder 48a and a compressed air tube 78a provides for the admission of air under pressure thereto. The cylinder 48a has a portion 49 telescoped within the sight tube 28a and sealed by a gasket 52a. Inclined passages 58a through the cylinder 48a direct air under pressure from the chamber 56a to the passage 47, so as to continuously prevent accumulation of foreign matter on the lens 44a by creating a vacuum in advance of the lens. The pyrometer within the casing 32a is lined through the lens 44a, the passage 47 and sight tube 28a to the furnace roof to respond to the temperature thereof. As pointed out in connection with the form of the invention shown in Figs. 1 and 2, there is provided a fusible plug 80a through the end wall 38a which, upon fusion due to excessive temperature, permits the air under pressure in chamber 56a to eject the delicate pyrometer in the casing 32a. The sight tube 28a intersects a tube 60a disposed substantially horizontally and extending through the furnace wall 10. The opening of the tube 60a at the inner end thereof is larger than the diameter of the sight tube 28a, as previously pointed out, to permit some accumulation of material without impairing the sight passage to the pyrometer.

The tube 60a has mounted therein a modified form of clearing plunger and operating mechanism therefor. A mounting plate 82 is suitably secured to the wall 18a and supports a pair of concentric inner and outer tubes or cylinders 83, 84, respectively, the inner tube 83 being connected to a source of fluid under pressure and the outer tube 84 forming with the inner tube an annular passage also connected to a source of fluid under pressure through the opening 85 in the mounting plate. The inner end of the inner tube 83 has fixed thereto a stationary head 86 and support flange 86a on which is slidably mounted an outer reciprocable casing 87 having a closing plate 88 at the outer end slidable on the tube 84 and sealed by a gasket 89 and a similar ring gasket 90 seals the casing 87 and head 86. The inner end of the tube 84 terminates short of the head 86 to provide access of fluid under pressure to the chamber 91 within the casing 87. A shock absorbing spring 92, or other suitable damping means, is supported by the head 86 and tube 84 for purposes to be referred to.

A piston head 93 is secured to the inner end of the casing 87 and is complementally telescoped with the stationary head 86 in retracted position, as shown, and the inner end of the tube 83 opens thereagainst. A plunger head 94 is removably mounted, as by the threaded connection 95, on the piston head 93. This plunger head 94 is illustrated as being dished or cup-like to present an annular inner working edge to knock off material which may accumulate around the inner end of the tube 60a.

In operation of the form of the invention shown in Fig. 3, fluid, such as air, under pressure is directed into the chamber 56a from the supply pipe 78a and thence through the inclined passages 58a and out through the sight tube into the furnace. The lens 44a is thus constantly cleared by the vacuum in advance thereof in the passage 47. As indicated in connection with Fig. 1, the open end of the tube or casing 60a may, for example, be cleared of accumulated material on each reversal of the furnace. Thus, by suitable means (not shown), air under pressure may be admitted to the tube 83 and against the end of the piston head 93 to force the head, plunger 94 and casing 87 inwardly as a unit. The inner edge of the plunger will clear off any material which may have accumulated around the end of the tube 60a. At the end of this inward stroke, the closing plate 88 on the casing 87 will engage and compress the spring 92 against the stationary piston head 86, thus to cushion the terminal part of the inward stroke of the plunger. In timed sequence, as, for instance, upon each reversal of firing of the furnace the fluid under pressure is cut off from the tube 83 and admitted through opening 85 to the annular chamber within the tube 84. The fluid under pressure will pass from the inner end of the tube 84 into the chamber 91 and react against the plate 88 to retract the casing, plunger and piston head assembly at a controlled slower rate to prevent jarring of the parts.

From the foregoing description it will be seen that the present invention provides a permanent furnace wall mounting for a temperature responsive device, such as a pyrometer, wherein continuous temperature reading of the wall or roof temperatures may be obtained; and wherein any accumulated material around the sight tube openings is periodically removed; and wherein there is provided a safety device for ejecting the pyrometer or the pyrometer and its enclosed housing should the temperature rise to a point which might cause damage to the relatively expensive temperature responsive element.

While certain forms of the invention have been shown and described for purposes of illustration, it is to be clearly understood that various changes in the details of construction and arrangement of parts may be made without departing from the spirit and scope of the invention as set forth in the appended claims.

I claim:

1. In a device of the character described, the combination of a furnace wall portion having an opening therein, a sight tube assembly mounted in said opening and including a water cooling jacket therearound, a radiation sensitive device mounted in said sight tube, a tubular housing included in said sight tube assembly and opening into the furnace at an angle to the angle of the sight tube and forming an opening greater than the diameter of the sight tube and through which the line of sight of the sight tube passes, and a plunger mechanism mounted in said tubular housing and operable between retracted and extended positions to remove any material accumulating around the furnace end of said tubular housing.

2. In a device as claimed in claim 1, wherein fluid pressure means are provided to project the plunger to its extended position and wherein spring means are provided for retracting the plunger.

3. In a device as claimed in claim 2 wherein the plunger is periodically actuated by the fluid pressure means upon each reversal of firing of the furnace.

4. In a device of the character described, the combination of a furnace wall portion having an opening therein, a sight tube and casing assembly mounted in said opening and including a water cooling jacket therearound, a radiation sensitive device mounted in said casing, means providing for the passage of fluid under pressure in a direction forwardly and in advance of said radiation sensitive device for creating a continuous vacuumized area in advance thereof whereby to prevent the accumulation of foreign matter on the surface of the radiation sensitive device, means providing a tubular housing disposed at an angle to the axis of the sight tube and opening into the furnace through an opening through which the line of sight of the sight tube passes, and a plunger assembly mounted in the said housing and operable between retracted and extended positions to remove material accumulating around the furnace end of the said housing.

5. A sight tube assembly comprising a casing, a sight tube mounted in said casing, a tubular housing mounted in said casing at an angle to the sight tube and opening through the casing around an aperture concentric with the sight tube but of greater diameter, and means providing a plunger assembly in said tubular housing operable between retracted and extended positions to clear the opening through the housing.

6. A sight tube assembly as claimed in claim 5, wherein the casing is provided with conduit means to admit cooling fluid thereto, and wherein the sight tube has at least a portion thereof enclosed by a chamber into which fluid under pressure may be admitted.

7. A sight tube assembly as claimed in claim 5, wherein the casing is provided with an additional opening extending entirely through the casing and spaced slightly from the sight tube so as to provide an auxiliary opening for checking purposes when installed for service.

8. A sight tube assembly as claimed in claim 5, wherein the plunger assembly comprises a reciprocable casing member mounted in said housing and carrying a replaceable plunger head at the inner end thereof.

9. A sight tube assembly as claimed in claim 8, wherein there is provided fluid pressure means for reciprocating said casing member and including telescoped fluid conduits for directing fluid under pressure to the interior of said casing member selectively for effecting movement thereof toward extended or retracted positions.

10. A sight tube assembly as claimed in claim 9, wherein a fixed head is carried at the inner end of one of said conduit members and dividing said casing member whereby fluid from one conduit member is directed to one side thereof and fluid from the other conduit member is directed to the opposite side thereof.

11. A sight tube assembly as claimed in claim 10, wherein spring cushioning means is asociated with the fixed head for cushioning terminal movement of the said reciprocable casing member.

12. A sight tube and pyrometer mounting for a furnace wall, and comprising a casing having inner and outer walls and peripheral walls connected thereto to form a chamber for cooling fluid, and a pair of hollow housing members within said casing and intersecting to open through a single aperture in the inner wall of the casing and through spaced apertures in the outer wall of the casing.

13. A sight tube and pyrometer mounting as claimed in claim 12, wherein the housing members intersect within the inner wall of the casing.

14. A sight tube and pyrometer mounting as claimed in claim 12, wherein one of the housing members is substantially horizontally disposed in said casing and wherein the other housing member is inclined to intersect the horizontal housing member adjacent the inner end thereof.

15. A sight tube and temperature sensitive device for mounting in a furnace wall, and comprising a casing for receiving cooling fluid, a tubular housing traversing the casing and opening inwardly and outwardly thereof, a sight tube and housing opening outwardly of said casing and intersecting the tubular housing adjacent the inner end thereof at an angle such that the line of sight of the sight tube passes through the inwardly open end of the tubular housing for unimpaired sighting through the said inner end of the tubular housing, a reciprocable plunger mechanism in said tubular housing operable between an inwardly extended position to clear the opening at the inner end of the tubular housing and a retracted position outwardly of the intersection opening between the tubular housing and the sight tube.

16. In a device of the character described, the combination of a furnace wall portion having an opening therethrough, a sight tube mounted in said opening, a casing aligned with said sight tube, a radiation sensitive device mounted in and substantially transversely filling the interior of the casing, means for directing fluid under pressure through the wall of the sight tube and forwardly within the sight tube to clear the same, and normally closed means associated with said casing and operable upon predetermined excessive temperatures to open and admit fluid under pressure into said casing for ejecting the radiation sensitive device outwardly therefrom and away from the sight tube.

17. In a device as claimed in claim 16, wherein the casing is provided with a fusible section operable to admit the fluid under pressure to the interior of the casing upon fusion thereof for ejecting the radiation sensitive device.

18. In a device of the character described, the combination of a furnace wall portion having an opening therein, a sight tube and casing assembly mounted in said opening and including a jacket therearound for a cooling medium, a radiation sensitive device mounted in said casing, annular chamber means surrounding the sight tube adjacent the end of the radiation sensitive device and isolating the sight tube from the cooling medium in the jacket, means for directing fluid under pressure to said chamber means, means providing passages through the wall of the sight tube in communication with the chamber means and inclined away from the adjacent end of the radiation sensitive device to direct fluid under pressure from said chamber means through and out of the inner end of said sight tube with creation of a vortex effect in advance of the radiation sensitive device preventing the accumulation of foreign matter on the surface thereof, and normally closed means between said casing and said annular chamber means operable upon predetermined excessive temperatures to open and admit fluid under pressure from said annular chamber means into said casing for ejecting the radiation sensitive device outwardly therefrom and away from the sight tube.

References Cited in the file of this patent

UNITED STATES PATENTS

| 2,232,594 | Dike | Feb. 18, 1941 |
| 2,388,386 | Cohen | Nov. 6, 1945 |
| 2,565,249 | Machler | Aug. 21, 1951 |
| 2,576,514 | Bianco et al. | Nov. 27, 1951 |

FOREIGN PATENTS

| 398,175 | Germany | July 10, 1924 |